United States Patent
Henkel et al.

(10) Patent No.: US 10,270,154 B2
(45) Date of Patent: Apr. 23, 2019

(54) ENERGY SUPPLY DEVICE COMPRISING FLEXIBLE CARRIER FILM WITH AN INTEGRATED ANTENNA

(71) Applicant: PHOENIX CONTACT GMBH & CO KG, Blomberg (DE)

(72) Inventors: Hartmut Henkel, Blomberg (DE); Jochen Zeuch, Blomberg (DE); Patrick Schweer, Hameln (DE)

(73) Assignee: PHOENIX CONTACT GMBH & CO KG, Blomberg (DE)

( * ) Notice: Subject to any disclaimer, the term of this patent is extended or adjusted under 35 U.S.C. 154(b) by 0 days.

(21) Appl. No.: 15/307,320

(22) PCT Filed: Apr. 23, 2015

(86) PCT No.: PCT/EP2015/058769
§ 371 (c)(1),
(2) Date: Oct. 27, 2016

(87) PCT Pub. No.: WO2015/165789
PCT Pub. Date: Nov. 5, 2015

(65) Prior Publication Data
US 2017/0179568 A1 Jun. 22, 2017

(30) Foreign Application Priority Data
Apr. 28, 2014 (DE) .................. 10 2014 105 918

(51) Int. Cl.
*H01Q 1/22* (2006.01)
*H01Q 1/38* (2006.01)
(Continued)

(52) U.S. Cl.
CPC ................ *H01Q 1/22* (2013.01); *H01Q 1/38* (2013.01); *H01Q 9/40* (2013.01); *H04B 1/03* (2013.01)

(58) Field of Classification Search
CPC ... H04B 1/03; H01Q 1/22; H01Q 9/40; H01Q 1/38; H01Q 1/24
See application file for complete search history.

(56) References Cited

U.S. PATENT DOCUMENTS 7,109,933 B2 * 9/2006 Ito ...................... A61B 1/00016
343/718
8,090,423 B2 * 1/2012 Na ........................ H01Q 1/243
455/117
(Continued)

FOREIGN PATENT DOCUMENTS

CN 1515049 A1 7/2004
CN 202257613 B1 5/2012
(Continued)

*Primary Examiner* — Tho G Phan
(74) *Attorney, Agent, or Firm* — Richard P. Gilly, Esquire; Archer & Greiner, P.C.

(57) ABSTRACT

The present invention relates to an energy supply device (100) comprising a housing and a communication interface (101) for wireless communication via a communication network, a flexible carrier film (103) which covers at least part of a housing side of the housing; an antenna (105) for the communication interface (101) of the energy supply device (100), the antenna (105) being arranged on the flexible carrier film (103); and a connection interface (107) for connecting the antenna (105) to the communication interface (101) of the energy supply device (100), said connection interface (107) being arranged on the flexible carrier film (103).

14 Claims, 5 Drawing Sheets

(51) Int. Cl.
*H01Q 9/40* (2006.01)
*H04B 1/03* (2006.01)

(56) References Cited

U.S. PATENT DOCUMENTS

| | | | |
|---|---|---|---|
| 8,123,131 B2 * | 2/2012 | Sawachi | G06K 19/0701 |
| | | | 235/451 |
| 9,531,062 B2 * | 12/2016 | Park | H01Q 1/273 |
| 2004/0185897 A1 | 9/2004 | Ostervall | |
| 2007/0229369 A1 * | 10/2007 | Platz | H01Q 1/085 |
| | | | 343/702 |
| 2010/0210300 A1 | 8/2010 | Rizzo et al. | |
| 2013/0009826 A1 | 1/2013 | Wu | |
| 2013/0131883 A1 | 5/2013 | Yamada | |
| 2015/0144507 A1 * | 5/2015 | Bain | G01N 27/3272 |
| | | | 205/792 |
| 2015/0227248 A1 * | 8/2015 | Yamazaki | G06F 3/0412 |
| | | | 345/173 |

FOREIGN PATENT DOCUMENTS

| | | |
|---|---|---|
| CN | 102869217 A1 | 1/2013 |
| DE | 91 12 597 U1 | 6/1992 |
| DE | 102 44 083 A1 | 3/2004 |
| DE | 10 2006 057 546 A1 | 1/2008 |
| DE | 20 2012 010 818 U1 | 11/2012 |
| DE | 11 2011 102 128 T5 | 4/2013 |
| DE | 10 2012 106 923 A1 | 1/2014 |
| DE | 10 2012 218 647 A1 | 4/2014 |
| EP | 2 581 857 A1 | 4/2013 |

\* cited by examiner

ENERGY SUPPLY DEVICE COMPRISING FLEXIBLE CARRIER FILM WITH AN INTEGRATED ANTENNA

FIELD OF THE INVENTION

The present invention relates to an energy supply device.

BACKGROUND OF THE INVENTION

An energy supply device, such as a voltage supply device or a current supply device, frequently has a plurality of connected component parts for operation of the energy supply device. Thus, the energy supply device may have an actuating element, such as a pushbutton, or such as a control knob for a potentiometer, which element may be employed for adjusting the energy supply device. E.g., the actuating element may be used to adjust an output voltage of the energy supply device. Also, the energy supply device may have a display unit for displaying information for operating the energy supply device. E.g., the display unit may have a liquid crystal display or a light-emitting diode, for displaying or for signaling an operating state. The energy supply device may also have a communication interface for wireless communication via a communication network. For this purpose, the energy supply device may have an antenna which is connected to the communication interface.

If the energy supply device has a housing, often each component among the plurality of connected components for operating the energy supply device is individually extended out of the housing. Often this results in costly provision of multiple openings in a housing wall of the housing.

BRIEF SUMMARY OF THE INVENTION

It is an object of the present invention to provide for an efficient concept for connecting component to an energy supply device.

The object is achieved by the subject matter having the features according to the independent claims. Advantageous embodiments of the invention are the subject matter of the drawings, the description, and the dependent claims.

According to a first aspect of the invention, the object is achieved by an energy supply device with a housing and with a communication interface for wireless communication over a communication network; comprised of: a flexible carrier film which covers at least part of a housing side of the housing, an antenna for the communication interface of the energy supply device, which antenna is disposed on the flexible carrier film, and a connection interface for connecting the antenna to the communication interface of the energy supply device, which connection interface is disposed on the flexible carrier film. This provides the advantage of enabling an antenna for the communication interface of the energy supply device to be efficiently connected.

The energy supply device may be an electrical energy supply device, such as a voltage supply device or a current supply device. Furthermore, the housing of the energy supply device may be a metal housing or a plastic housing.

The communication interface may comprise a wireless communication interface. E.g., the communication interface comprises an interface for wireless communication via Radio Frequency Identification (RFID), e.g. according to the standard ISO/IEC 14443 or ISO/IEC 18000-3, an interface for wireless communication via Near Field Communication (NFC), e.g. according to the standard ISO/IEC 14443 or ISO/IEC 18092; or an interface for wireless communication according to one of the standards Bluetooth, ZigBee, or Wireless Local Area Network (W-LAN).

The communication network may be a telephone network, a mobile telephone network, a computer network, e.g. a Local Area Network (LAN) or a Wireless Local Area Network (W-LAN), or the Internet.

The flexible carrier film may be a front film. The antenna may be formed by a conductive path on the flexible carrier film. E.g., the flexible carrier film comprises a film body with a copper coating, wherein a conductive path can be formed by an etching process. Further, the flexible carrier film may be coated with an electrically insulating protective layer, to provide contact protection for the antenna. The connection interface may be formed by an electrical contact surface on the flexible carrier film.

According to an advantageous embodiment of the energy supply device, a housing wall of the housing of the energy supply device has a housing opening in which the connection interface is introduced, in order to connect the antenna with the communication interface. This provides the advantage that the antenna can be efficiently connected to the communication interface.

The housing opening may be a slot. Furthermore, the housing wall can be a front plate.

According to another advantageous embodiment of the energy supply device, the communication interface of the energy supply device comprises a radio frequency identification interface or a near field communication interface. This provides the advantage that an efficient communication interface can be used for the wireless communication over a communication network.

The radio frequency identification interface can be an interface for wireless communication via Radio Frequency Identification (RFID), e.g., according to the standard ISO/IEC 14443 or ISO/IEC 18000-3.

The near field communication interface can be an interface for wireless communication via Near Field Communication (NFC), e.g., according to the standard ISO/IEC 14443 or ISO/IEC 18092.

According to yet another advantageous embodiment of the energy supply device, in addition an actuating element, particularly a pushbutton, for operating the energy supply device, is disposed on the flexible carrier film. This provides the advantage that the energy supply device can be efficiently operated.

The actuating element may be a pushbutton or a control knob. E.g., the energy supply device is switched on and/or off by means of the actuating element.

According to still another advantageous embodiment of the energy supply device, the actuating element is connected to a control circuit board disposed in the housing, via the connection interface. This provides the advantage that the actuating element can be efficiently connected to the energy supply device.

The control circuit board may be designed to control a function of the energy supply device, in response to actuation of the actuating element. Also, the control circuit board may be disposed on a secondary side of the energy supply device.

In another advantageous embodiment of the energy supply device, in addition a display element, particularly a liquid crystal display, for displaying information for operating the energy supply device, is disposed on the flexible carrier film. This provides the advantage of facilitating the operation of the energy supply device.

The display element may comprise a liquid crystal display and/or a seven-segment display. The display element may be used, e.g., to display an actual value or target value of an output voltage of the energy supply device.

According to another advantageous embodiment of the energy supply device, the display element is connected to a control circuit board disposed in the housing, via the connection interface. This provides the advantage that the display element can be efficiently connected to the energy supply device.

The control circuit board can also be designed to control the display element.

According to yet another advantageous embodiment of the energy supply device; in addition a lighting element, particularly a light-emitting diode, for signaling the operating state of the energy supply device, is disposed on the flexible carrier film. This provides the advantage that the operating state of the energy supply device can be efficiently indicated.

E.g., the lighting element may be utilized to indicate that an input voltage of the energy supply device exceeds a predetermined threshold value.

According to still another advantageous embodiment of the energy supply device, the lighting element is connected to a control circuit board disposed in the housing, via the connection interface. This provides the advantage that the lighting element can be efficiently connected to the energy supply device.

The control circuit board can also be designed to control the lighting element, in another advantageous embodiment of the energy supply device, in addition the communication interface of the energy supply device is comprised of a wire-connected interface, and the flexible carrier film has an opening for passage of a connection of the wire-connected interface. This provides the advantage that the flexible carrier film can be efficiently adapted to the energy supply device.

According to another advantageous embodiment of the energy supply device, the antenna is disposed on a primary side of the energy supply device. This provides the advantage that the surface of the housing side can be efficiently utilized.

According to yet another advantageous embodiment of the energy supply device, an insulating element for providing electrical insulation is disposed between the energy supply device and the flexible carrier film. This provides the advantage that the flexible carrier film and the components disposed on the flexible carrier film can be configured so as to be contact-safe with regard to the user.

According to a second aspect of the invention, the object of the invention is achieved by a flexible carrier film for covering at least part of a housing side of a housing of an energy supply device, wherein the energy supply device has a communication interface for wireless communication over a communication network; said film having an antenna for the communication interface of the energy supply device, and a connection interface for connecting the antenna to the communication interface of the energy supply device. This provides the advantage that a flexible carrier film can be provided for efficient connection of a component to an energy supply device.

According to an advantageous embodiment of the flexible carrier film, the antenna is designed as an antenna for a radio frequency identification interface or as an antenna for a near field communication interface. This provides the advantage that an antenna can be provided for an efficient communication interface for wireless communication over a communication network.

According to another advantageous embodiment of the flexible carrier film, in addition an actuating element, particularly a pushbutton, for operating the energy supply device, is disposed on the flexible carrier film, said actuating element being connectable to a control circuit board disposed in the housing, via the connection interface. This provides the advantage that an actuating element can be proved for efficiently connecting to an energy supply device.

According to yet another advantageous embodiment of the flexible carrier film, in addition a display element, particularly a liquid crystal display, for displaying information for operating the energy supply device, is disposed on the flexible carrier film, said display element being connectable to a control circuit board disposed in the housing, via the connection interface. This provides the advantage that a display element for efficient connection to an energy supply device can be provided.

According to still another advantageous embodiment of the flexible carrier film, in addition a lighting element, particularly a light-emitting diode; for signaling the operating state of the energy supply device, is disposed on the flexible carrier film, said lighting element being connectable to a control circuit board disposed in the housing, via the connection interface. This provides the advantage that a lighting element for efficient connection to an energy supply device can be provided.

In another advantageous embodiment of the flexible carrier film; in addition the communication interface of the energy supply device comprises a wire-connected interface, and the flexible carrier film has an opening for passage of a connection of the wire-connected interface. This provides the advantage that the flexible carrier film can be efficiently adapted to the energy supply device.

Exemplary embodiments of the invention are illustrated in the drawings, and will be described in more detail in the following.

BRIEF DESCRIPTION OF THE SEVERAL VIEWS OF THE DRAWINGS

Shown are.

DETAILED DESCRIPTION OF THE INVENTION

Figure 1:
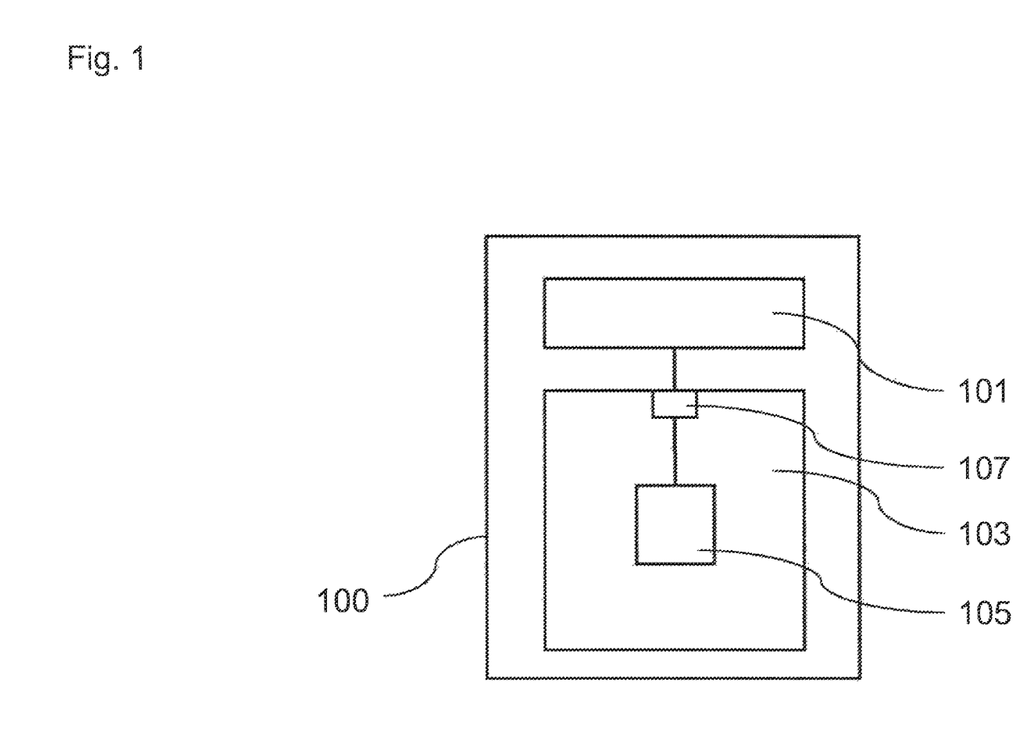
FIG. 1 a schematic diagram of an energy supply device according to an embodiment.

FIG. 1 shows a schematic diagram of an energy supply device 100 according to an embodiment. The energy supply device 100 is comprised of a communication interface 101, a flexible carrier film 103, an antenna 105, and a connection interface 107.

The energy supply device 100 is provided with a housing and the communication interface 101 for wireless communication over a communication network, and further with: the flexible carrier film 103 which covers at least part of a housing side of the housing, the antenna 105 for the communication interface of the energy supply device 100, which antenna 105 is disposed on the flexible carrier film 103, and the connection interface 107 for connecting the antenna 105 to the communication interface 101 of the energy supply device 100, said connection interface 107 being disposed on the flexible carrier film 103.

The energy supply device 100 may be an electrical energy supply device, such as a voltage supply device or a current supply device. Furthermore, the housing of the energy supply device 100 may be a metal housing or a plastic housing.

The communication interface 101 may comprise a wireless communication interface. E.g.; the communication interface 101 comprises an interface for wireless communication via Radio Frequency Identification (RFID), e.g. according to the standard ISO/IEC 14443 or ISO/IEC 18000-3, a communication interface for wireless communication via Near Field Communication (NFC), e.g. according to the standard ISO/IEC 14443 or ISO/IEC 18092, or a communication interface for wireless communication according to one of the standards Bluetooth, ZigBee, or Wireless Local Area Network (W-LAN).

The communication network may be a telephone network, a mobile telephone network, a computer network, e.g. a Local Area Network (LAN) or a Wireless Local Area Network W-LAN, or the Internet.

The flexible carrier film 103 may be a front film. Furthermore, the antenna 105 can be formed by a conductive path on the flexible carrier film 103. E.g., the flexible carrier film 103 may comprise a film body with a copper coating, from which a conductive path can be formed by an etching process. Further, the flexible carrier film 103 may be coated with an electrically insulating protective layer, to provide contact protection for the antenna 105. The connection interface 107 may be formed by an electrical contact surface on the flexible carrier film 103.

Figure 2:
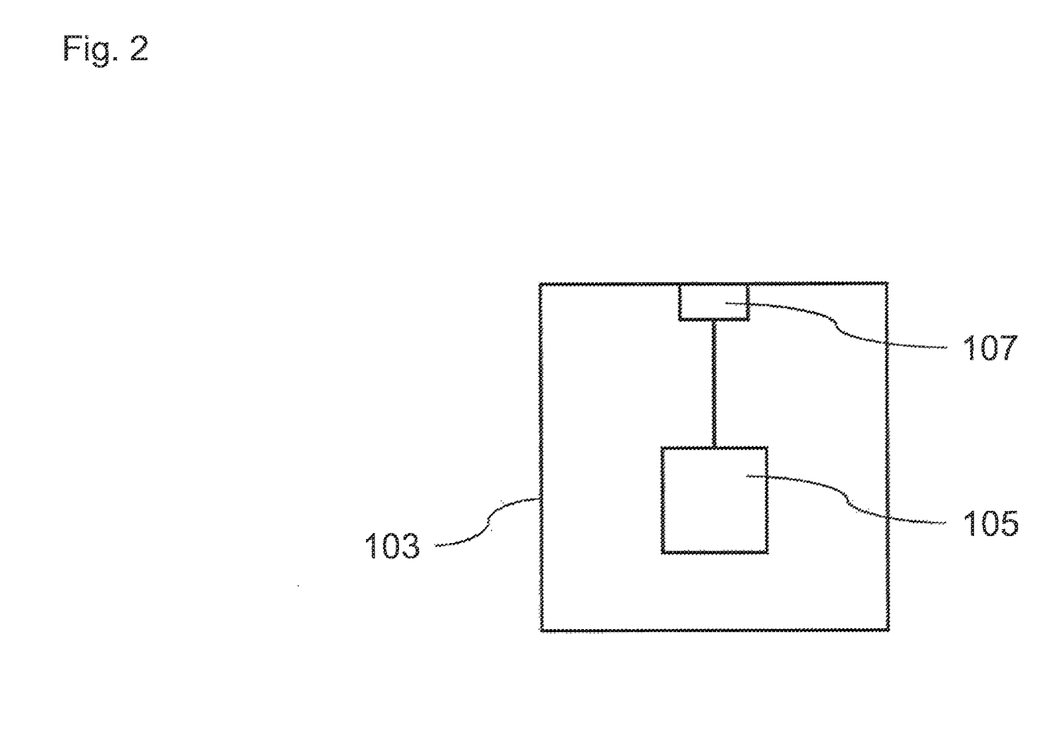
FIG. 2 a schematic diagram of a flexible carrier film according to an embodiment.

FIG. 2 shows a schematic diagram of a flexible carrier film 103 according to an embodiment. An antenna 105 and a connection interface 107 are disposed on the flexible carrier film 103.

The flexible carrier film 103 which covers at least part of a housing side of an energy supply device 100, wherein the energy supply device 100 has a communication interface 101 for wireless communication over a communication network, is provided with the antenna 105 for the communication interface 101 of the energy supply device 101 and with the connection interface 107 for connecting the antenna 105 with the communication interface 101 of the energy supply device 100.

Figure 3:
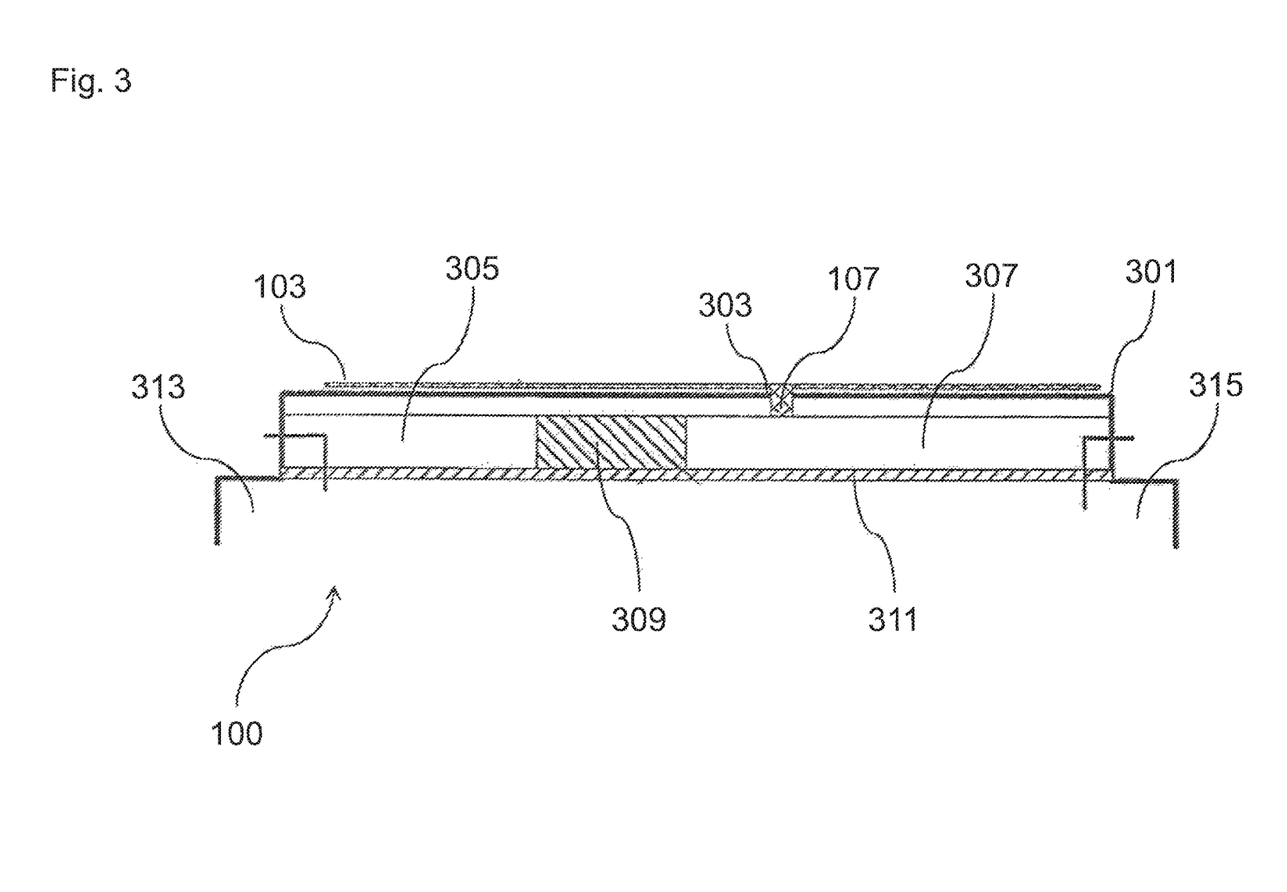
FIG. 3 a cross sectional view of an energy supply device according to an embodiment.

FIG. 3 shows a cross sectional view of an energy supply device 100 according to an embodiment. The energy supply device 100 comprises a housing 301 with a housing opening 303, a primary side 305, a secondary side 307, an insulating means 309, a circuit board 311 an input 313, and an output 315. A flexible carrier film 103 is provided, with the connection interface 107 of the flexible carrier film 103 being introduced into the housing opening 303 and being electrically conductively connected to the secondary side 307.

The housing 301 may be a metal housing or a plastic housing. Further, the flexible carrier film 103 may form a multifunctional front film or may be an element of a multifunctional front film. The primary side 305, the secondary side 309, and the insulating means 309 may be disposed on the circuit board 311. The circuit board 311 may be or may be comprised of a printed circuit board (PCB).

The primary side 305 of the energy supply device 100 may be designed to receive an input signal via the input 313. Also, the secondary side 307 may be designed to deliver an output signal via the output 315. The primary side 305 and secondary side 307 may be designed for converting the input signal into the output signal, E.g., the primary side 305 and the secondary side 307 form a transformer. For this purpose, the primary side 305 comprises a first coil with a first number of coil windings and the secondary side 307 comprises a second coil with a second number of coil windings. Electrical insulation between the respective coils may be provided by the insulating means 309. If the first number of coil windings is greater than the second number of coil windings, then the amplitude value of a voltage of the output signal may be smaller than an amplitude value of a voltage of the input signal. By suitable choice of the respective numbers of coil windings, it is possible, by means of the secondary side, to provide a contact-safe voltage for powering an operating unit, such as an actuating element, and/or a display unit, such as a display element of the energy supply device 100. If the actuating element and/or the display element is disposed on the flexible carrier film 103, it is possible to provide, via the connection interface 107 which is electrically conductively connected to the secondary side 307, a contact-safe supply voltage for powering the actuating element and/or the display element.

According to an embodiment, parts of an operating unit and/or of a display unit may be disposed on the flexible carrier film 103. Also, the flexible carrier film may be disposed on a front plate of the housing 301. The parts of the operating unit and/or the display unit may be disposed at the altitude level of the primary side 305, given that they are separated from the primary side 305 by the housing 301.

According to another embodiment, an antenna 105 for the communication interface 101 for wireless communication over the communication network or over a radio communication means may be disposed on the flexible carrier film 103. An arrangement of the antenna 105 outside the housing 301 may enable a wider range for the wireless communication. Further, it is possible to avoid penetration of a housing wall of the housing 301 in order to enable radio communication. This may be of particular advantage if the housing 301 is a metal housing.

According to yet another embodiment, the costs of the electrical insulation can be reduced, given that no additional air passages and/or creepage paths are needed between the operating unit powered via the secondary side 307 and the primary side 305 of the energy supply device 100.

According to still another embodiment, components for operation and display, e.g. pushbuttons and light-emitting diodes, may be disposed on the flexible carrier film 103 or a flexible foil plate. Also, an antenna 105 may be disposed on the flexible carrier film 103, which antenna is designed as an antenna of a near field communication interface. The antenna 105 may particularly be disposed above the primary side 305 or above a primary circuit. The flexible carrier film 103 may be curved on one side and can be inserted through a housing opening 303 of the housing 301, e.g. through a slot in a front plate, and in the housing 301 it may be connected with the secondary side 307. Further, the flexible carrier film 103 may have an opening for passage of a connection of a wire-connected communication interface of the energy supply device 100. E.g., the energy supply device 100 comprises a plug connector on the front, for signaling purposes.

According to an embodiment, the housing 301 may be a metal housing. According to a different embodiment, the housing 301 may be comprised of various housing materials, particularly plastic.

According to another embodiment, the housing 301 may be grounded. In this case, an electrical insulating means, such as basic insulation, may be disposed between the primary side 305 of the energy supply device 100 and the housing 301. Ca. twice the amount of insulation may be provided between the primary side 305 and the secondary side 307, e.g. in the form of insulating means 309. Further, an enhanced insulation may be provided between a flexible carrier film 103, e.g. an operating film or a plate, disposed on the housing 301, and the primary side 305.

According to yet another embodiment, a geometric dimension of the housing 301 may be slightly increased by the thickness of the flexible carrier film 103 and by the geometric dimension of the component parts disposed on the flexible carrier film 103.

Figure 4:
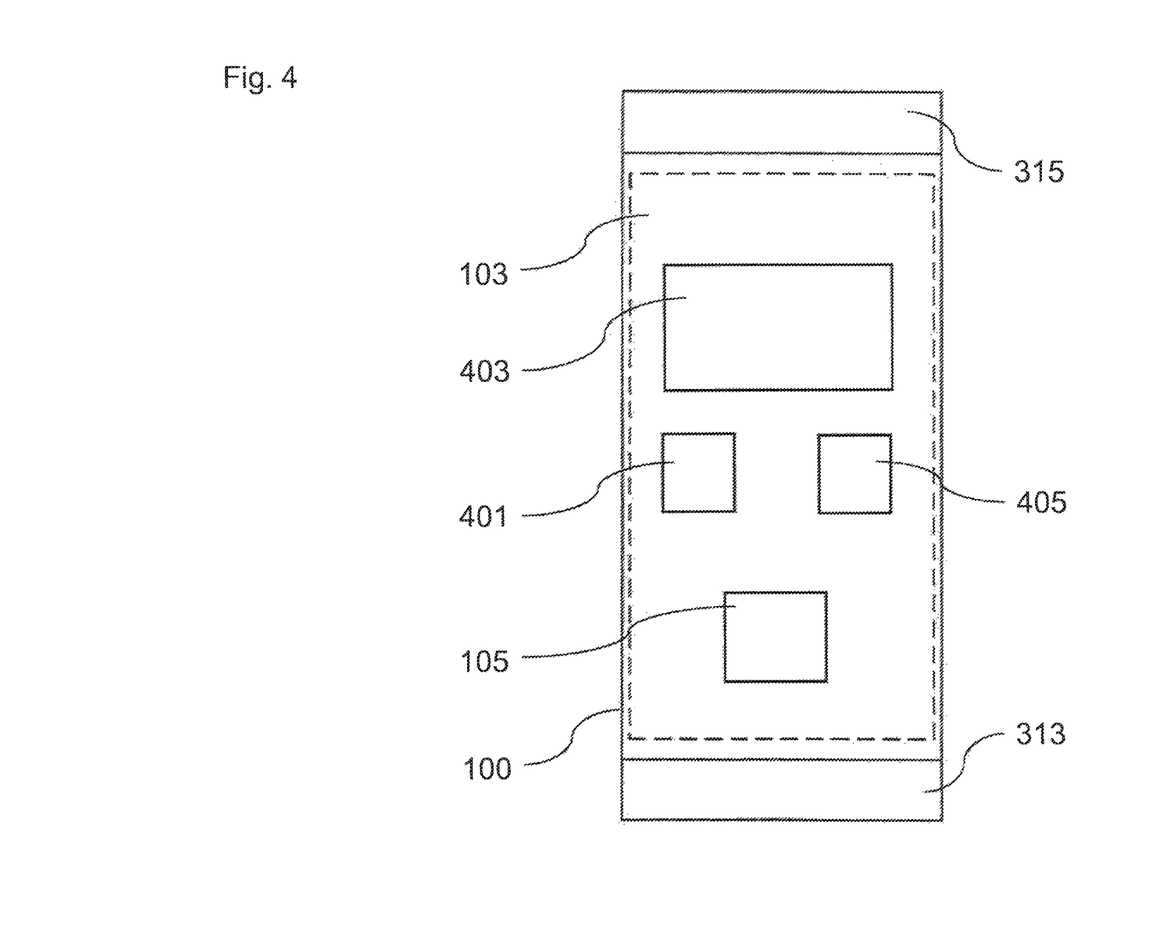
FIG. 4 a view of an energy supply device according to an embodiment.

FIG. 4 shows a view of an energy supply device 100 according to an embodiment. The energy supply device is comprised of an input 313, an output 315, and a flexible carrier film 103. An antenna 105, an actuating element 401, a display element 403, and a lighting element 405, as operating elements for the energy supply device 100, are disposed on the flexible carrier film 103.

The actuating element 401 may comprise a pushbutton and/or a control knob. Furthermore, the display element 403 may comprise a liquid crystal display or a seven-segment display. The lighting element 405 may comprise a light-emitting diode.

Figure 5:
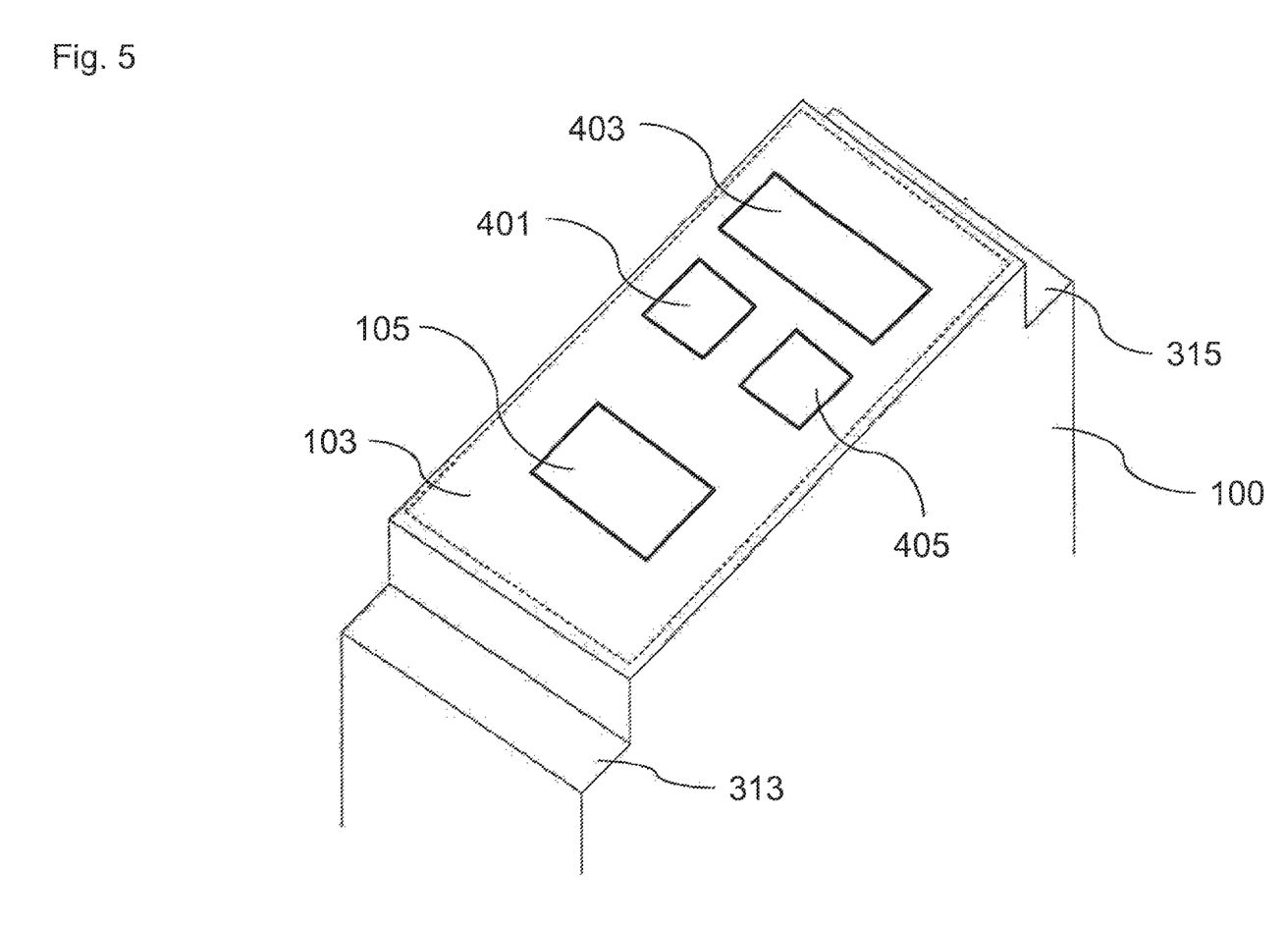
FIG. 5 a perspective view of an energy supply device according to an embodiment.

FIG. 5 shows a perspective view of an energy supply device according to an embodiment. The energy supply device is comprised of an input 313, an output 315, and a flexible carrier film 103. An antenna 105, an actuating element 401, a display element 403, and a lighting element 405, as operating elements for the energy supply device 100, are disposed on the flexible carrier film 103.

The energy supply device 100 illustrated in FIG. 5 corresponds to the energy supply device 100 illustrated in FIG. 4.

All features described and illustrated in connection with particular embodiments may be provided in various combinations in the subject matter of the invention, with the aim of realizing their advantageous effects simultaneously.

The scope of protection of the present invention is provided by the claims, and is not limited to the features elucidated in the description or illustrated in the drawings.

LIST OF REFERENCE NUMERALS

100 Energy supply device
101 Communication interface
103 Flexible carrier film
105 Antenna
107 Connection interface
301 Housing
303 Housing opening
305 Primary side
307 Secondary side
309 Insulating means
311 Circuit board
313 Input
315 Output
401 Actuating element
403 Display element
405 Lighting element

The invention claimed is:

1. An energy supply device (100) with a housing (301) and with a communication interface (101) for wireless communication over a communication network; comprised of:
 a flexible carrier film (103) which covers at least part of a housing side of the housing (301);
 an antenna (105) for the communication interface (101) of the energy supply device (100), which antenna (105) is disposed on the flexible carrier film (103); and
 a connection interface (107) for connecting the antenna (105) to the communication interface (101) of the energy supply device (100), which connection interface (107) is disposed on the flexible carrier film (103);
 wherein the communication interface (101) of the energy supply device (100) additionally is comprised of a wire-connected interface, and wherein the flexible carrier film (103) has an opening for passage of a connection to the wire-connected interface.

2. The energy supply device (100) according to claim 1, wherein a housing wall of the housing (301) of the energy supply device (100) has a housing opening (303) in which the connection interface (107) is introduced, in order to connect the antenna (105) with the communication interface (101).

3. The energy supply device (100) according to claim 1, wherein the communication interface (101) of the energy supply device (100) comprises a Radio Frequency Identification interface or a Near Field Communication interface.

4. The energy supply device (100) according to claim 1, wherein in addition, an actuating element (401), for operating the energy supply device (100) is disposed on the flexible carrier film (103).

5. The energy supply device (100) according to claim 4, wherein the actuating element (401) is connected to a control circuit board disposed in the housing (301), via the connection interface (107).

6. The energy supply device (100) according to claim 1, wherein in addition, a display element (403) for displaying an information for operating the energy supply device (100) is disposed on the flexible carrier film (103).

7. The energy supply device (100) according to claim 6, wherein the display element (403) is connected to a control circuit board disposed in the housing (301), via the connection interface (107).

8. The energy supply device (100) according to claim 1, wherein in addition a lighting element (405) for signaling the operating state of the energy supply device (100) is disposed on the flexible carrier film (103).

9. The energy supply device (100) according to claim 8, wherein the lighting element (405) is connected to a control circuit board disposed in the housing (301), via the connection interface (107).

10. A flexible carrier film (103) for covering at least part of a housing side of a housing (301) of an energy supply device (100), wherein the energy supply device (100) has a communication interface (101) for wireless communication over a communication network; said film having:
 an antenna (105) for the communication interface (101) of the energy supply device (100); and
 a connection interface (107) for connecting the antenna (105) to the communication interface (101) of the energy supply device (100);
 wherein the communication interface (101) of the energy supply device (100) additionally is comprised of a wire-connected interface, and wherein the flexible carrier film (103) has an opening for passage of a connection to the wire-connected interface.

11. The flexible carrier film (103) according to claim 10, wherein the antenna (105) is in the form of an antenna for a Radio Frequency Identification interface or an antenna for a Near Field Communication interface.

12. The flexible carrier film (103) according to claim 10, wherein in addition, an actuating element (401) for operating the energy supply device (100) is disposed on the flexible carrier film (103), said actuating element (401) being connectable to a control circuit board disposed in the housing (301), via the connection interface (107).

13. The flexible carrier film (103) according to claim 10, wherein in addition, a display element (403) for displaying information for operating the energy supply device (100) is disposed on the flexible carrier film (103), said display element (403) being connectable to a control circuit board disposed in the housing (301), via the connection interface (107).

14. The flexible carrier film (103) according to claim 10, wherein in addition, a lighting element (405) for signaling the operating state of the energy supply device (100) is disposed on the flexible carrier film (103), said lighting element (405) being connectable to a control circuit board disposed in the housing (301), via the connection interface (107).

* * * * *